US008365077B2

(12) United States Patent
Sakakibara et al.

(10) Patent No.: US 8,365,077 B2
(45) Date of Patent: Jan. 29, 2013

(54) HELP MENU DISPLAY PROCESSING WITH REFERENCE TO PROVISIONAL AND DEFINITIVE USER SELECTIONS

(75) Inventors: Masayoshi Sakakibara, Kanagawa (JP); Nobuo Iwata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 876 days.

(21) Appl. No.: 12/050,984

(22) Filed: Mar. 19, 2008

(65) Prior Publication Data

US 2008/0244402 A1 Oct. 2, 2008

(30) Foreign Application Priority Data

Apr. 2, 2007 (JO) .................................. 2007-096628

(51) Int. Cl.
*G06F 3/00* (2006.01)

(52) U.S. Cl. ........ 715/708; 715/705; 715/709; 715/710; 715/713

(58) Field of Classification Search .................. 715/705, 715/713, 708–710
See application file for complete search history.

(56) References Cited

U.S. PATENT DOCUMENTS

| 5,442,687 | A * | 8/1995 | Miller ...................... 379/100.01 |
| 5,513,308 | A * | 4/1996 | Mori ............................ 715/707 |
| 6,021,403 | A * | 2/2000 | Horvitz et al. ................... 706/45 |
| 6,233,570 | B1 * | 5/2001 | Horvitz et al. ................... 706/11 |
| 6,262,730 | B1 * | 7/2001 | Horvitz et al. .................. 715/707 |
| 6,964,024 | B2 * | 11/2005 | Marchionda et al. ......... 715/811 |
| 2001/0026290 | A1 * | 10/2001 | Machida et al. .............. 345/810 |
| 2004/0100504 | A1 * | 5/2004 | Sommer ........................ 345/810 |
| 2005/0185215 | A1 * | 8/2005 | Nishizawa et al. .......... 358/1.15 |
| 2005/0266866 | A1 * | 12/2005 | Ahya et al. ..................... 455/502 |
| 2006/0036991 | A1 * | 2/2006 | Biazetti et al. ................ 717/104 |
| 2006/0271876 | A1 * | 11/2006 | Holmes et al. ................ 715/771 |
| 2006/0279810 | A1 * | 12/2006 | Momose et al. .............. 358/518 |
| 2006/0291889 | A1 * | 12/2006 | Kwak et al. ..................... 399/81 |

(Continued)

FOREIGN PATENT DOCUMENTS

| EP | 1043650 | 10/2000 |
| JP | 2096823 A | 4/1990 |

(Continued)

OTHER PUBLICATIONS

Sukaviriya, et al., "Supporting Adaptive Interfaces in a Knowledge-Based User Interface Environment," Intelligent User Interfaces, 1993, pp. 107-113.*

(Continued)

*Primary Examiner* — Kieu Vu
*Assistant Examiner* — Eric J Bycer
(74) *Attorney, Agent, or Firm* — Gesmer Updegrove LLP

(57) ABSTRACT

An information processor includes an information processing unit that executes an information process by reference to a setting, a setting unit that executes a provisional selection to select one or more selection items among multiple selection items and a definitive selection for deciding the provisional selection by reference to an operation by a user and determines a setting of the information process by reference to a result of the definitive selection, a determination unit that determines a selection item to be explained by reference to one or more selection item provisionally selected by the setting unit, and an explanation outputting unit that outputs an explanation for the user for the selection item to be explained which is determined by the determination unit.

17 Claims, 16 Drawing Sheets

U.S. PATENT DOCUMENTS

| | | | |
|---|---|---|---|
| 2007/0050721 A1* | 3/2007 | de Souza | 715/810 |
| 2007/0118814 A1* | 5/2007 | Greer | 715/810 |
| 2007/0136667 A1* | 6/2007 | Gerhart et al. | 715/705 |
| 2007/0174150 A1* | 7/2007 | Wadhwa | 705/28 |

FOREIGN PATENT DOCUMENTS

| | | | |
|---|---|---|---|
| JP | 4195626 | | 7/1992 |
| JP | 08153004 A | * | 6/1996 |
| JP | 09016362 A | * | 1/1997 |
| JP | 11231998 A | * | 8/1999 |
| JP | 2000163186 | | 6/2000 |
| JP | 2000227826 A | * | 8/2000 |
| JP | 2000231429 A | * | 8/2000 |
| JP | 2000305684 | | 11/2000 |
| JP | 2003044193 | | 2/2003 |
| JP | 2003345487 A | * | 12/2003 |
| JP | 2005165944 A | * | 6/2005 |
| JP | 2005234818 A | * | 9/2005 |
| JP | 2005244903 | | 9/2005 |
| JP | 2006164058 A | * | 6/2006 |

OTHER PUBLICATIONS

Virvou, Maria, "Automatic reasoning and help about human errors in using an operating system," Interacting with Computers 11, 1999, pp. 545-573.*

Notice of Grounds for Rejection mailed in Oct. 18, 2011, in connection with JP Application No. 2007-096628 and English translation thereof.

Japanese Decision of Rejection mailed on Jan. 17, 2012, in connection with Japanese Patent Application Serial No. 2007-096628 and English translation thereof.

* cited by examiner

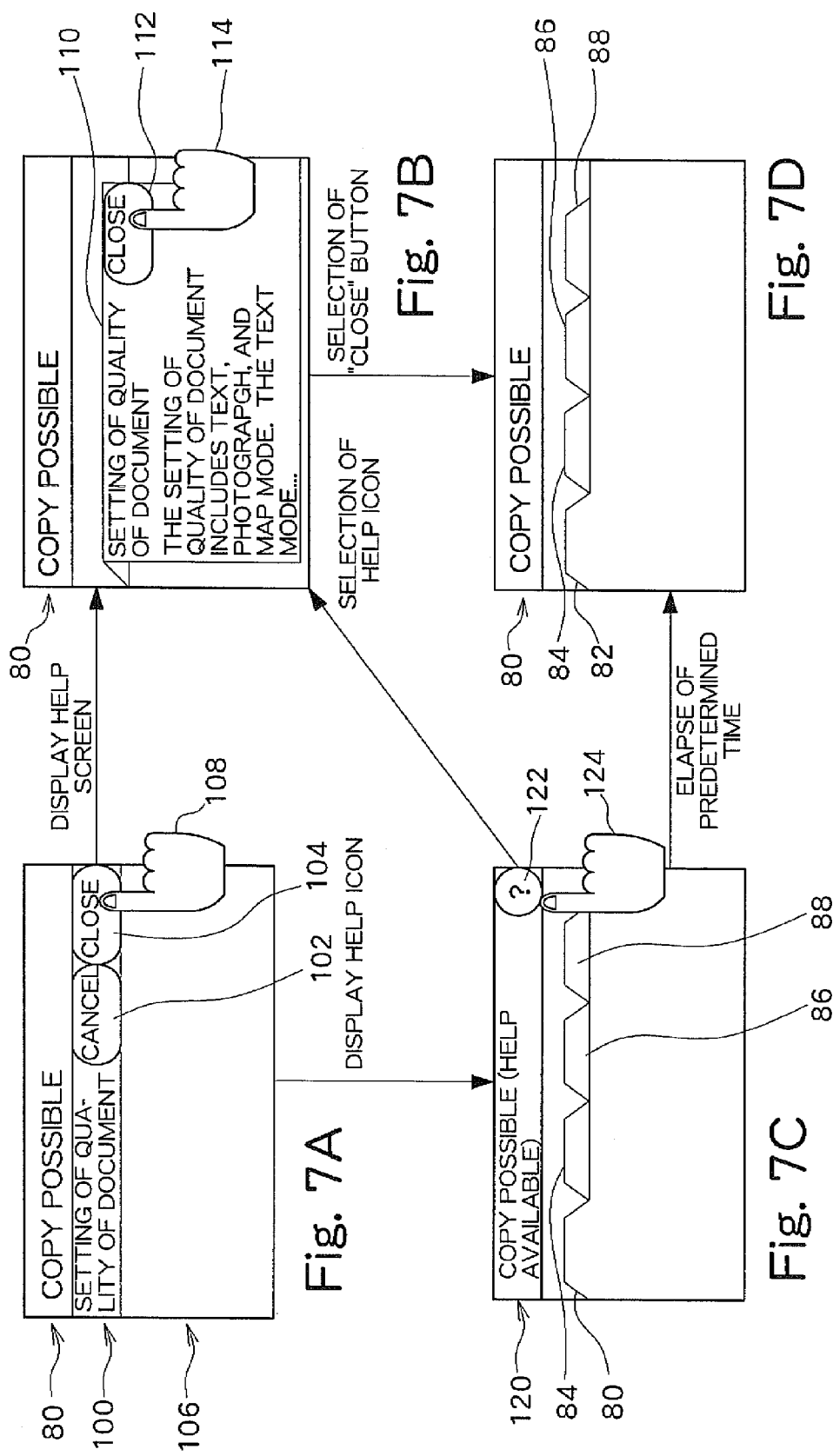

| | ITEM TO BE DISPLAYED | EXAMPLE |
|---|---|---|
| 1 | PROVISIONALLY SELECTED FUNCTION SETTING ITEM AND DETAILED FUNCTION SETTING ITEM | Hc, Hd, He, Hf, Hm |
| 2 | FUNCTION SETTING ITEM PROVISIONALLY SELECTED FOR MULTIPLE TIMES | Hc, He |
| 3 | PROVISIONALLY SELECTED FUNCTION SETTING ITEM AND DETAILED FUNCTION SETTING ITEM + ITEMS IN HIERARCHICAL LEVEL AS THESE ITEMS | Hb, Hc, Hd, He, Hf + Hl, Hm, Hn |
| 4 | PROVISIONALLY SELECTED SELECTION ITEM IN HIERARCHICAL LEVEL HAVING PREDETERMINED RATIO OR GREATER OF ITEMS PROVISIONALLY SELECTED | Hc, Hd, He, Hf, (EXAMPLE OF PREDETERMINED RATIO OF 50%) |
| 5 | FUNCTION ITEMS IN SAME HIERARCHICAL LEVEL AS FUNCTION ITEM PROVISIONALLY SELECTED FOR MULTIPLE TIMES AND SELECTION ITEM OF UPPER LEVEL | Ha, Hb, Hc, Hd, He, Hf |
| 6 | PROVISIONALLY SELECTED FUNCTION ITEM AND FUNCTION ITEMS IN LOWER LEVEL | Hc, Hd, He, Hf, + Hg, Hh, Hi + Hj, Hk + Hl, Hm, Hn |

Fig. 8

| TYPE OF UNCLEAR POINT | DESCRIPTION FORMAT | SELECTION FORMAT | DISPLAY FORMAT |
|---|---|---|---|
| DOES NOT KNOW HOW TO USE FUNCTION | FUNCTION DESCRIPTION FORMAT | MANUAL STRUCTURE FORMAT | WIZARD FORMAT |
| DOES NOT KNOW MEANING OF CHOICE | FUNCTION ITEM DETAIL EXPLANATION FORMAT | INTER-FUNCTION RELATION FORMAT | TEXT FORMAT |
| CANNOT FIND DESIRED FUNCTION | FUNCTION DESCRIPTION FORMAT | INTER-FUNCTION RELATION TERM SIMILARITY FORMAT | MENU FORMAT |
| DIFFERENT FROM FAMILIAR MACHINES | FUNCTION ITEM DETAIL EXPLANATION FORMAT | INTER-MACHINE CORRESPONDENCE RELATIONSHIP FORMAT | MENU FORMAT |

Fig. 13

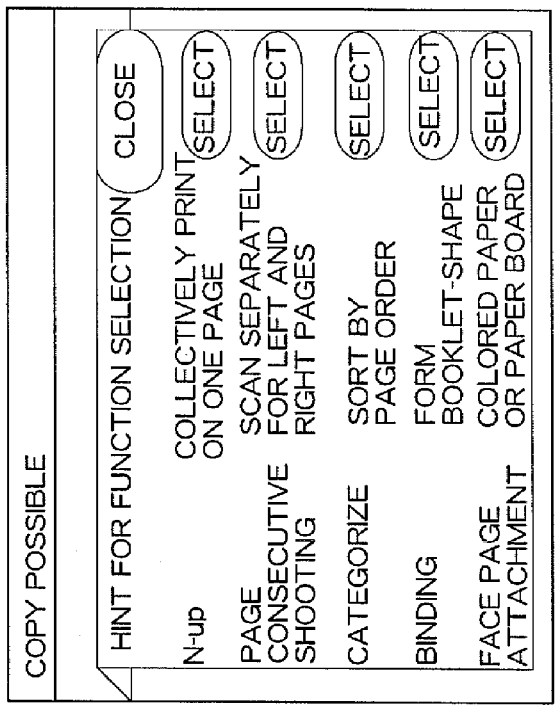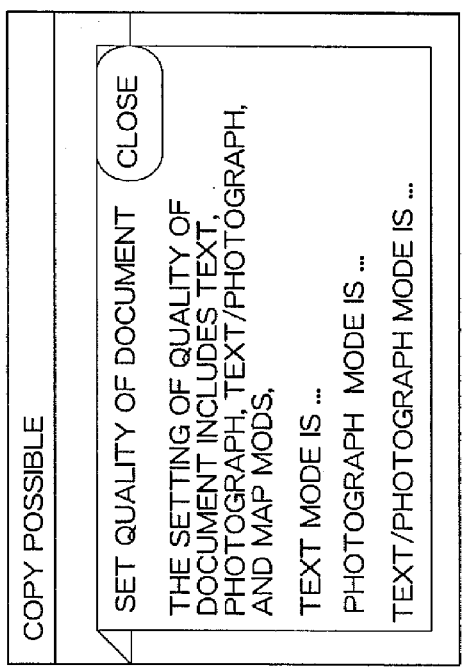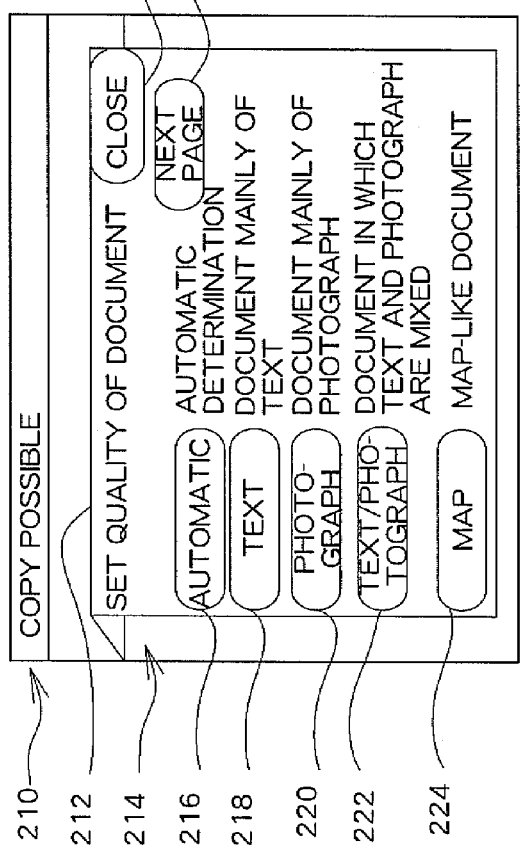

HELP MENU DISPLAY PROCESSING WITH REFERENCE TO PROVISIONAL AND DEFINITIVE USER SELECTIONS

CROSS-REFERENCE TO RELATED APPLICATIONS

This application is based on and claims priority under 35 USC 119 from Japanese Patent Application No. 2007-096628 filed on Apr. 2, 2007.

BACKGROUND

1. Technical Field

The present invention relates to an information processor, an information processing method, and a recording medium for storing an information processing program.

2. Related Art

When a computer has numerous information processing functions, a user interface for operating the information processing functions becomes complicated.

SUMMARY

According to one aspect of the present invention, there is provided an information processor including an information processing unit that executes an information process by reference to a setting; a setting unit that executes a provisional selection to select one or more selection items among multiple selection items and a definitive selection for deciding the provisional selection by reference to an operation by a user and determines a setting of the information process by reference to a result of the definitive selection; a determination unit that determines a selection item to be explained, by reference to one or more selection item provisionally selected by the setting unit; and an explanation outputting unit that outputs an explanation for the user for the selection item to be explained determined by the determination unit.

BRIEF DESCRIPTION OF THE DRAWINGS

Exemplary embodiment(s) of the present invention will be described in detail by reference to the following figures, wherein:

FIGS. 7A to 7D are diagrams showing an example of a help display on a touch panel;

FIG. 8 is a diagram exemplifying a standard for selecting a selection item for which help is to be displayed;

FIG. 13 is a diagram exemplifying a format of a help display;

FIGS. 15A to 15E are diagrams for explaining an example of a help display.

DETAILED DESCRIPTION

[Explanation of Terms]

Figure 1:
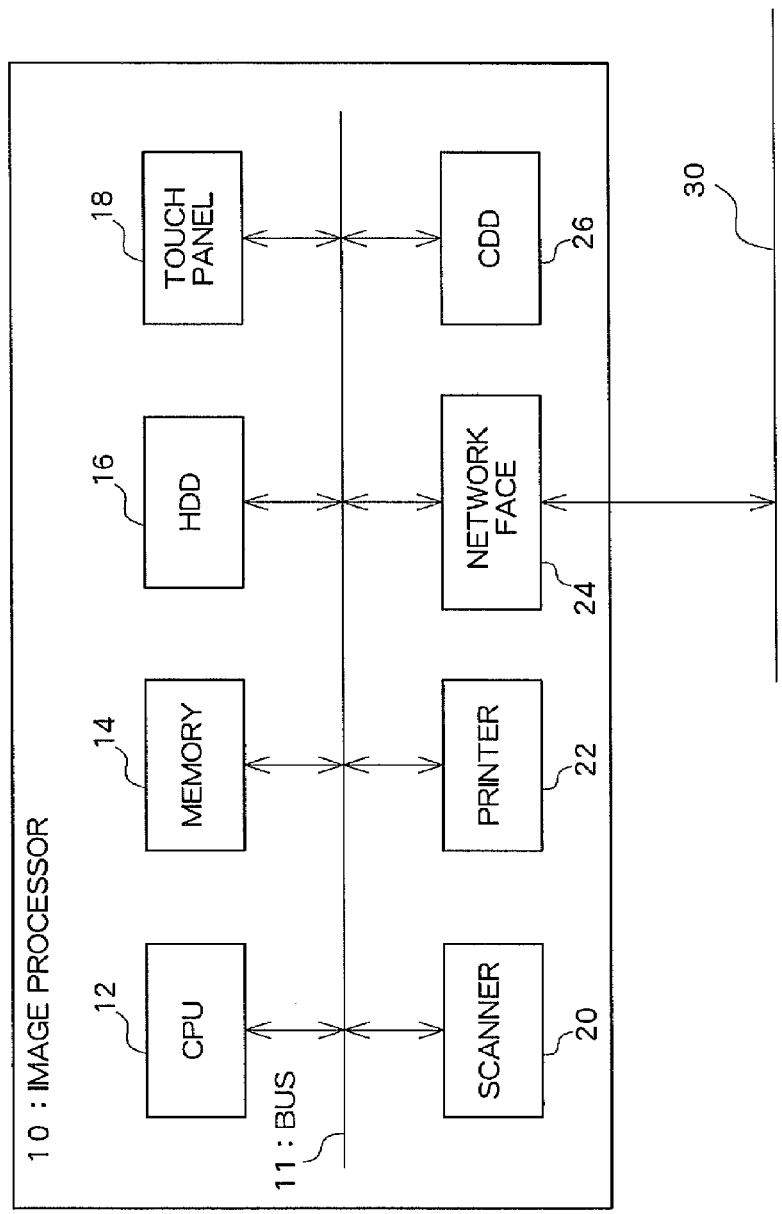
FIG. 1 is a block diagram showing an example hardware structure of an image processor according to an exemplary embodiment of the present invention.

In the following description, some of the terms used in the claims, specification, and drawings will be explained.

An "information processor" is a device in which computer hardware is controlled by software and an information processing unit, a setting unit, a determination unit, and an explanation outputting unit are constructed. As the computer hardware, various types of hardware may be used, such as general-purpose hardware such as a PC (Personal Computer), hardware with a special structure such as an ASIC (Application Specific Integrated Circuit), and hardware in which hardware having a special function is built in, such as a printer or a scanner.

The "information processing unit" is a unit which executes a certain information process by reference to a setting by the setting unit, and the "setting unit" is a unit which sets the setting for the information process. The setting for the information process is set on the basis of acceptance of an operation of a user through an inputting device and a network and an accepted result. The acceptance process is typically executed by means of a user interface provided by the information processor.

In the information processing unit, multiple selection items are provisionally selected, a definitive selection is executed for deciding the provisional selection result, and setting of the information process is set on the basis of the result of the definitive selection. The "provisional selection" refers to a selection which is performed before a sequence of setting actions is decided. For example, when the selection items are displayed in a viewable manner (when the menu, tab, window, etc. of the selection item can be opened even without proceeding to the stages after the viewing), the provisional selection includes the action to view the selection item. Alternatively, when the selection item is selectable (when selecting or not selecting is arbitrary, and cancelling of a temporarily selected item and selection of a temporarily non-selected item are permitted), the provisional selection includes the action to temporarily select the selection item. When the user does not know the position of the desired function setting screen or the name of the desired function, often, the user frequently repeats provisional setting of the selection item by estimation and cancelling of the provisional selection. The "definitive selection", on the other hand, is an action to decide the provisional selection of the selection item and reflect the selection result to the setting of the information process. In other words, the definitive selection is an action to complete the sequence of setting actions. The "sequence of setting actions" may be, for example, an action related to a setting of a single function or an action related to setting of complex functions in which multiple functions are combined.

The "determination unit" determines a selection item to be explained, on the basis of a selection item provisionally selected by the setting unit. The determination unit does not need to always determine a selection item to be explained, and, depending on a situation of the provisional selection, the determination unit may conclude that no selection item is to be explained. The "explanation" is a description for allowing the user to understand the function, operation, advantage, etc. of the selection item, and may also be referred to as "guidance" or "help".

The "explanation outputting unit" outputs an explanation to the user for a selection item determined to be explained. The output of the explanation may be, for example, in a visual form such as display on the user interface of a text, a still image (illustration and photograph), or a video image, or may be in an auditory form through sound. The explanation is typically output at an early stage after the selection item is determined, such as immediately after the selection item to be explained is determined or at a later time after a suitable pause. For a user who does not like forceful explanation, there may be employed a configuration in which the user is inquired of implementation of the explanation (whether a part or all of the selection item is to be explained or whether a part or all of the selection item is not to be explained).

In the determination unit, the selection item to be explained to the user may be determined, when the setting unit definitively selects the selection item, on the basis of a relationship between the definitively selected selection item and the provisionally selected selection item. Examples of the relationship between the definitively selected selection item and the provisionally selected selection item include a temporal distance relationship indicating the time period before the definitive selection the provisional selection is made, a spatial distance indicating the distance from the definitively selected selection item to the provisionally selected selection item when the selection items are arranged spatially (for example, in a hierarchical manner), and similarity relationship of the names and functions between the definitively selected selection item and the provisionally selected selection item. The determination unit may evaluate the strength of such a relationship by reference to a threshold value and a condition, for example, and determine the selection item to be explained.

The determination unit may execute the process to determine the selection item to be explained to the user when a redundancy of the provisional selection by the setting unit is detected before the setting unit definitively selects the selection item or after the setting unit definitively selects the selection item. Here, "redundancy" is a state in which the time required for selection is longer than a standard time or a state in which the number of operation steps of the provisional selection is greater than a standard number. Examples of the redundancy detected before the definitive selection include a state in which the length of elapsed time from the time of the first operation of the provisional selection is longer than a standard time and a state in which a number of operation steps of the provisional selection consecutively executed after the first operation of the provisional selection is greater than a standard number. Examples of the redundancy detected after the definitive selection include a state in which a length of elapsed time from the first operation of the provisional selection to the definitive selection is longer than a standard time determined for that particular definitive selection or a standard time determined generally for definitive selections, and a state in which a number of operation steps of provisional selection from the first operation of the provisional selection to the definitive selection is greater than a standard number determined for that particular definitive selection or a standard number generally determined for definitive selections.

The information processor may further include a display unit which displays a display space in which selection items are placed. In addition, in place of or in addition to the setting unit, there may be provided another setting unit which moves in the display space and selects the selection item on the basis of an operation of a user and sets the setting of the information process by reference to the selection result. Moreover, in place of or in addition to the determination unit, there may be provided another determination unit which determines a selection item to be explained on the basis of a trajectory of movement of the setting unit in the display space. The selection items placed in the display space may be of a hierarchical structure or of a list structure. The display space may be a two-dimensional space, a three-dimensional space, or a space which changes as time elapses. Typically, a part of the display space is displayed and the display range is changed following a user operation or the like. The setting unit is continuously or non-continuously moved in the display space and selects the selection item. In the selection, the provisional selection and the definitive selection may be distinguished. The result of the movement can be tracked as a trajectory in the display space. The trajectory may be tracked, for example, as a path connecting selected selection items or may be tracked as a transition of the screens displayed in a switching manner in accordance with a selection result. For movement in the display space performed by means of a pointer such as a mouse, the trajectory may be recognized as the trajectory drawn by the pointer.

[First Exemplary Embodiment]

A first exemplary embodiment will now be described.

FIG. 1 is a block diagram showing an example hardware structure of an image processor 10 according to an exemplary embodiment of the present invention. The image processor 10 is an example device of an "information processor" and an "image processing system", and includes various devices, including a bus 11 which is an internal communication path, a CPU 12 connected to the bus 11, a memory 14, an HDD (Hard Disk Drive) 16, a touch panel 18, a scanner 20, a printer 22, a network interface 24, and a CDD (Compact Disk Drive) 26.

The CPU 12 is a device having an arithmetic logic circuit, and, under the control of a program, executes an information process including an image process, control of various devices in the image processor 10, and control of communication with the outside through the network interface 24. The memory 14 is a storage device which includes a semiconductor memory such as a ROM (Read Only Memory) and a RAM (Random Access Memory). In addition to storing the program for controlling the CPU 12, the memory 14 also functions as a main memory when the CPU 12 executes a program. The HDD 16 is a large capacity storage device having a magnetic disk. The touch panel 18 includes a liquid crystal display as an image displaying device which displays an image on the basis of image data, and a touch input mechanism serving as an inputting device for accepting a user operation and inputting a signal to the CPU 12. The scanner 20 is a reading device which reads paper and generates image data. The printer 22 is a printing device which prints on paper on the basis of image data. The network interface 24 is a device for transmitting and receiving data to and from an external device through a network 30. For example, when a program for controlling the CPU 12 is provided through the network 30, the program is stored in the memory 14 through the network interface 24 and is installed (set as being executable). The CDD 26 is a device which reads and writes data from and to a CD (Compact Disk) serving as a recording medium. For example, when the program for controlling the CPU 12 is provided in a recorded form on a CD, the program is stored in the memory 14 through the CDD 26 and is installed.

An operation of the image processor 10 will be briefly described. On the touch panel 18 of the image processor 10, various selection items to be selected by the user are displayed, such as function items provided for function setting, display control items for controlling display on the touch panel 18, and execution control items for controlling execution of a process to which a function is set. The user touches (or presses) a location on the surface of the touch panel 18 corresponding to a desired selection item and selects the selection item. In this process, a new selection item corresponding to the selected selection item is displayed on the touch panel 18, and the user selects a new selection item. By repeating such an operation sequence, the user interactively sets setting related to the image process, and instructs the execution of the image process by reference to the setting. The scanner 20 and the printer 22 execute generation of image data by reading paper or printing on paper by reference to image data and according to the set configuration.

Figure 2:
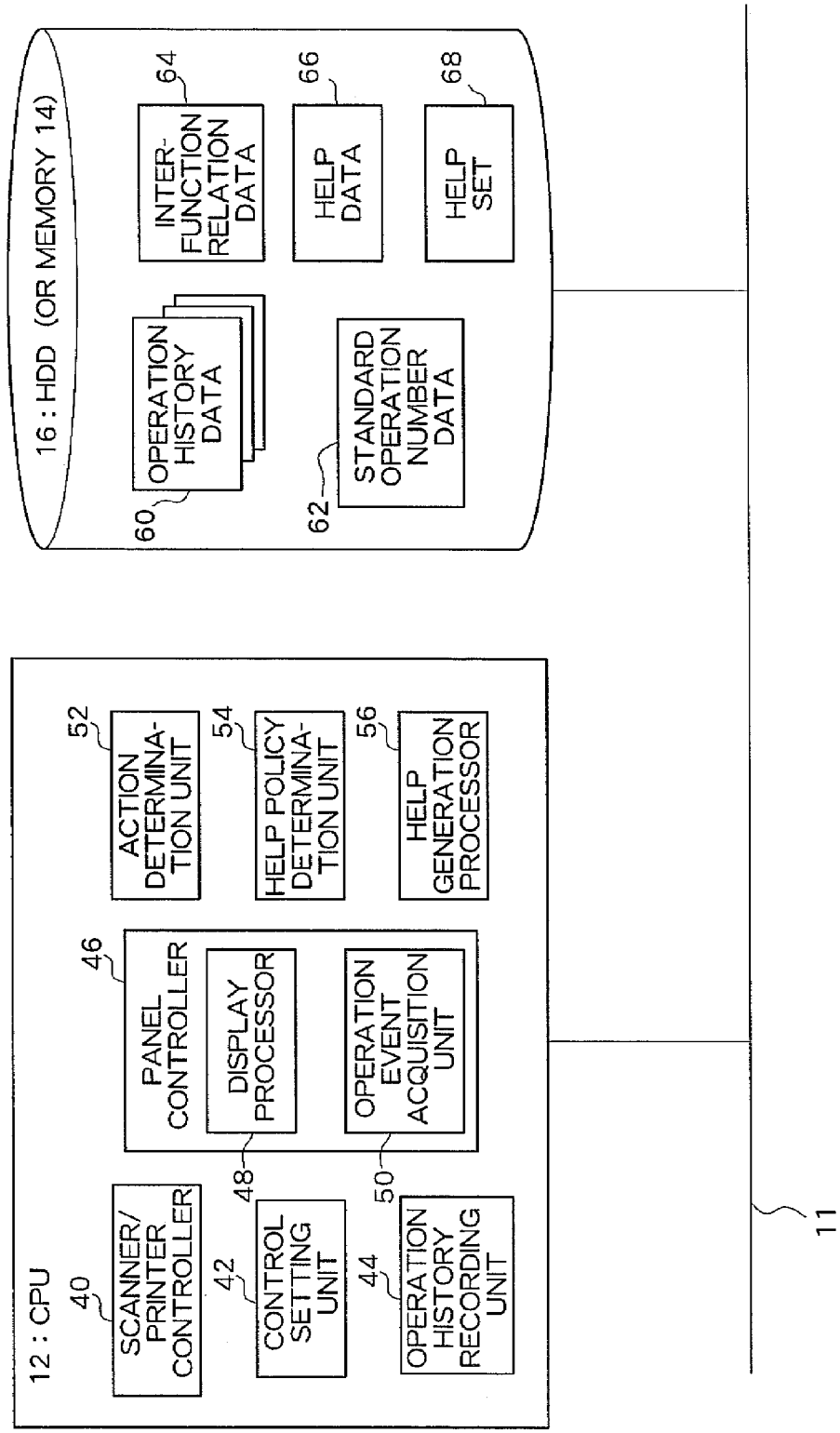
FIG. 2 is a block diagram showing an example functional structure in an image processor.

FIG. 2 is a block diagram showing an example functional structure in the image processor 10. FIG. 2 shows an example of a functional structure constructed on the CPU 12 by control of a program stored in the memory 14 and an example of various data stored in the HDD 16 (or memory 14) following the execution of the program.

In the CPU 12, there are constructed functional processors, including a scanner/printer controller 40, a control setting unit 42, an operation history recording unit 44, a panel controller 46, an action determination unit 52, a help policy determination unit 54, and a help generation processor 56. Of these, the panel controller 46 includes a display processor 48 and an operation event acquisition unit 50. The HDD 16 stores operation history data 60, standard operation number data 62, inter-function relation data 64, help data 66, and a help set 68.

The scanner/printer controller 40 functions as an "information processing unit", and executes an information process for controlling an operation of the scanner 20 or the printer 22 and an image process of adjustment or work of image data handled by the scanner 20 or printer 22. The control setting unit 42 sets the processing function of the information process and image process to be executed by the scanner/printer controller 40. The operation history recording unit 44 acquires a user operation executed from the touch panel 18 through the operation event acquisition unit 50 and stores the same in the HDD 16 as the operation history data 60. The panel controller 46 manages the touch panel 18, and the display processor 48 of the panel controller 46 displays an image on the touch panel 18 by reference to the image data. The operation event acquisition unit 50 of the panel controller 46 analyzes the user operation on the touch panel 18 in relation to the displayed image, and accepts the operation.

The action determination unit 52 determines whether or not there is a function item to be explained to the user or which of the function items is to be explained (help is to be displayed), by reference to the operation history data 60. The determination is typically executed by reference to the operation history data 60 for the current user operation. Alternatively, reference may be made to the operation history data 60 recording past user operations. The action determination unit 52 evaluates the operation history data 60 by reference to the standard operation number data 62 which is used as a determination threshold value, and the inter-function relation data 64 indicating a relation between function items, and dynamically determines the function item to be explained.

The help policy determination unit 54 determines which method according to which help set 68 is to be used for referring to the help data 66 when the help is to be displayed. The help generation processor 56 generates an image for displaying help, by reference to a determination result by the action determination unit 52 and a determination result of the help policy determination unit 54. The generated image is displayed by the display processor 48.

The operation history data 60 is data recorded by the operation history recording unit 44, and is data in which a history of user operation is managed for each user. The standard operation number data 62 is data describing a standard number of operation steps necessary for setting each process; that is, a number indicating how many times the operations must be typically executed on the touch panel 18 in order to realize the process function to be executed. The standard operation number data 62 may include a standard number of operation steps for each single process function (for example, magnification selection) or may include a standard number of operation steps for a combination of process functions (for example, a book format double-side printing and stapling process). In addition, in the standard operation number data 62, the standard number of operation steps for each job; that is, execution of a sequence of image processes such as scanning, printing, and copying, may be set. The standard operation number data 62 may be set by reference to a minimum number of operation steps (for example, by adding a predetermined number to the minimum number of operation steps or multiplying the minimum number of operation steps by a predetermined multiplier), or may be set on the basis of a history of the user operation (for example, by adding a predetermined number to an average value or multiplying the average value by a predetermined multiplier). The inter-function relation data 64 is data storing the strength of relation between function items. The strength of relation may be set in various manners, and may be defined, for example, by reference to a strength of inclination of recognition by the user as being similar, such as the similarity of the function itself or the similarity of the name of the function.

The help data 66 are data including an explanation item for a function item or a function item located at a lower level of a certain function item. The help data 66 are sub-divided for each explanation item provided corresponding to the function item so that an arbitrary explanation item can be extracted. The help set 68 is data for setting a format of cutting out of the explanation item form the help data 66, and includes multiple cut-out formats. Examples of the cut-out format include a format based on a functional relationship, a format based on similarity in the terms, and other arbitrary collection formats.

The display of the function items by the display processor 48, the acquisition of the user operation by the operation event acquiring unit 50, and the setting of the process function by the control setting unit 42 form a part of the "setting unit". The action determination unit 52 which determines a function item to be explained functions as the "determination unit". The help policy determination unit 54 and the help generation processor 56 correspond to the "explanation outputting unit" which outputs an explanation using the help data 66 and the help set 68.

Figure 3:
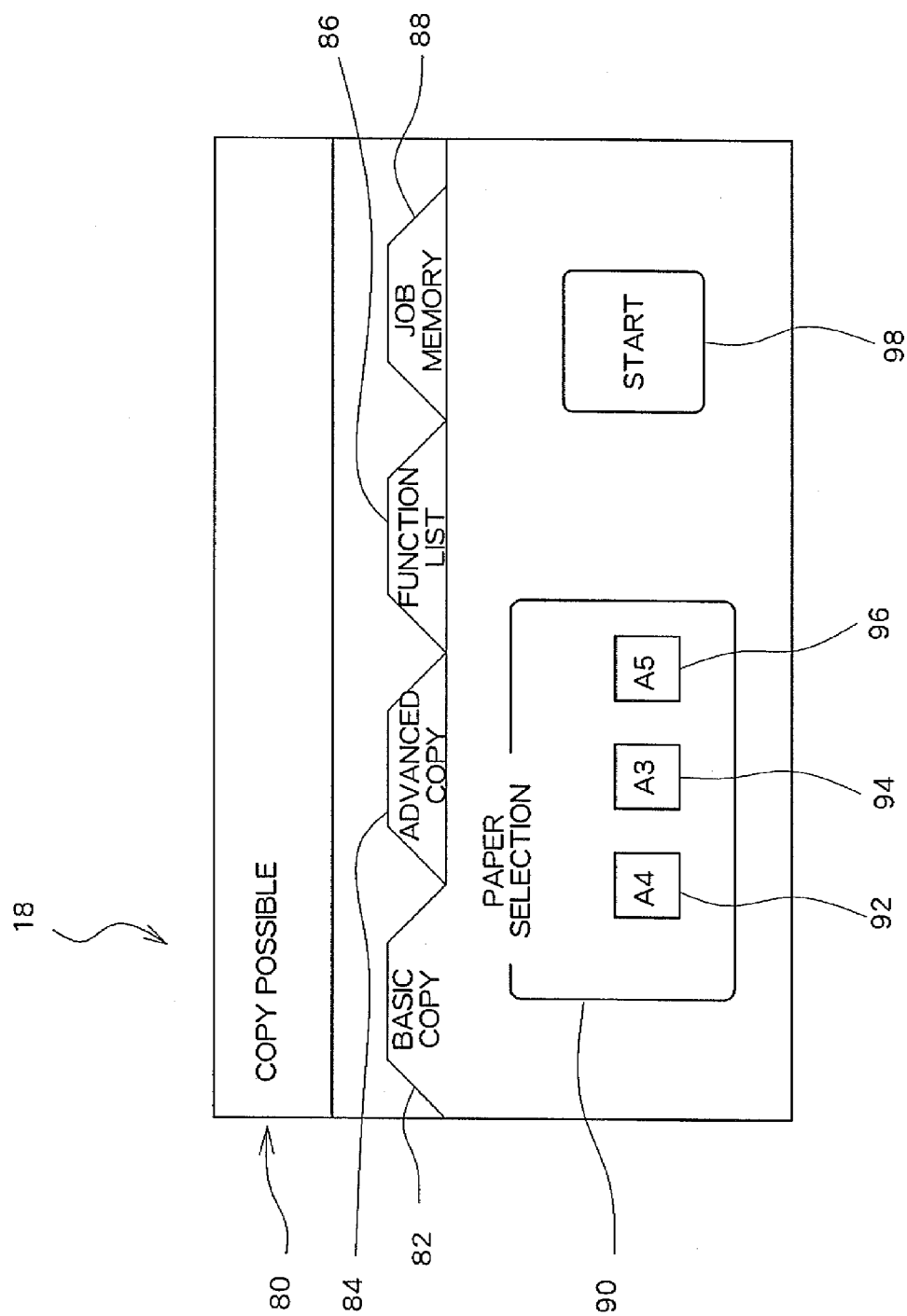
FIG. 3 is a diagram showing an example display on a touch panel.

Next, a display on the touch panel 18 will be described with reference to FIG. 3. On a screen of the touch panel 18 shown in FIG. 3, a text indicating the state of the image processor 10 such as "copy possible" shown by reference numeral 80 is displayed on an upper portion. Below this text, there are displayed selection items including a "basic copy", which is set to a tab 82; an "advanced copy", which is set to a tab 84; a "function list", which is set to a tab 86; and a "job memory", which is set to a tab 88. Of these, the item of "basic copy" shown by the tab 82 is an item which is displayed to be settable in an initial state. In the item of "basic copy", a column of paper selection 90 is provided, and the "basic copy" includes items for selecting paper of "A4", "A3", and "A5" denoted by reference numerals 92, 94, and 96, respectively, and an instruction item to "start" copying denoted by reference numeral 98. The user selects, for example, "A5" denoted by reference numeral 96 to select the paper size, and instructs execution of copy to A5-size paper by touching "start" denoted by reference numeral 98. The user selects, for example, the "advanced copy" of the tab 84 so that display related to the "advanced copy" is realized, and the user sets advanced process functions included in the "advanced copy".

Figure 4:
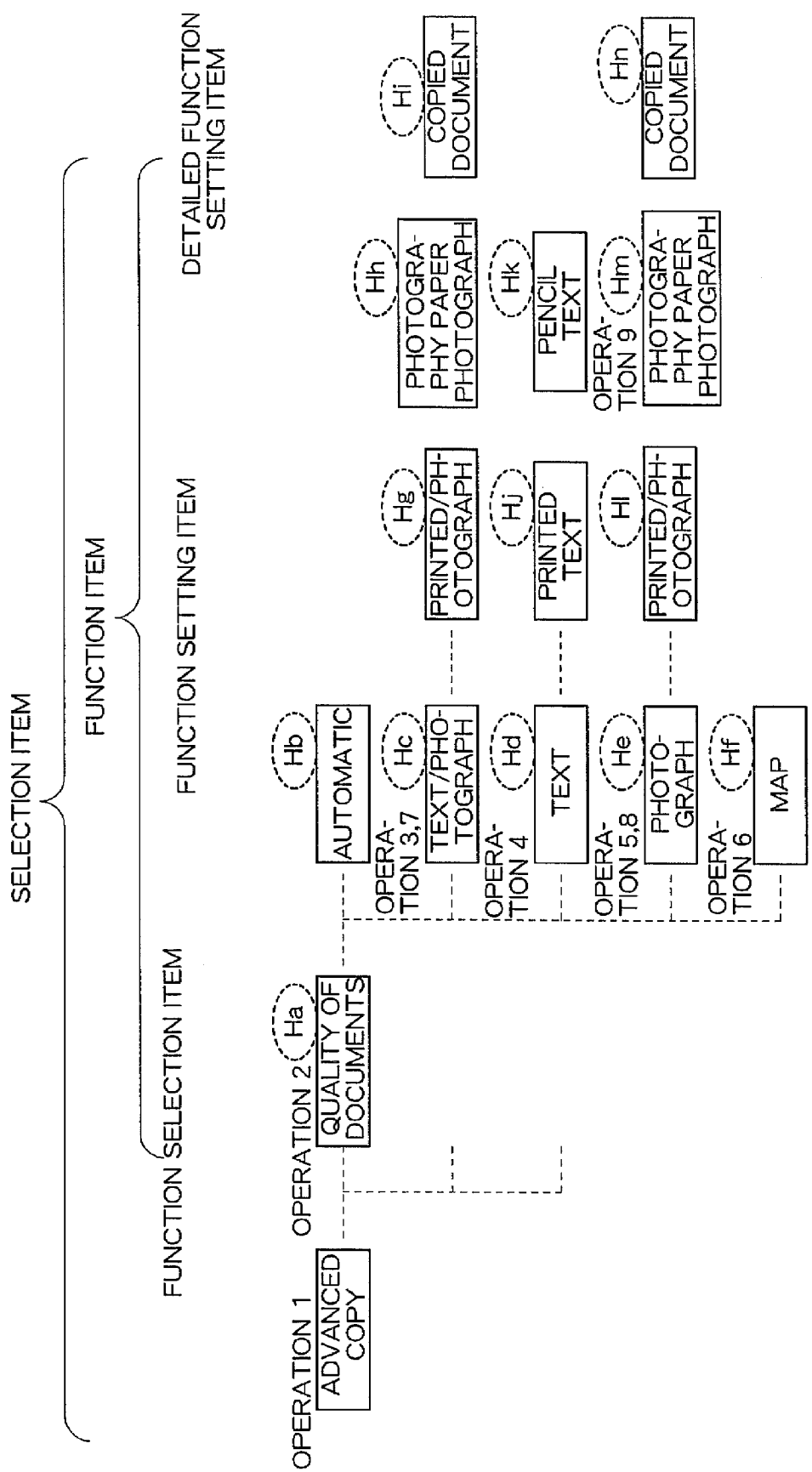
FIG. 4 is a diagram showing an example hierarchical selection item.

FIG. 4 is a diagram for explaining hierarchical selection items provided below the selection item shown by the tab 84, which is "advanced copy". In the illustrated configuration, function items which are selection items used in the function setting are provided immediately below the "advanced copy" in three hierarchical levels. Of these, a "function selection item" at an upper level is an item for selecting a summary of a function to be set; a "function setting item" at an intermediate level is an item for designating a setting value in the "function selection item" at the upper level; and a "detailed function setting item" at a lower level is an item for setting detailed setting which cannot be designated by the "function setting item" at the intermediate level. More specifically, in the "function selection item", multiple items are provided, including "quality of document." Below the item of "quality of document" (function setting item), items of "automatic", "text/photograph", "text", "photograph", and "map" are provided. Of these items, "detailed function setting items" including "printed photograph", "photography paper photograph", and "copied document" are provided below the item of "text/photograph"; "detailed function setting items" of "printed text" and "pencil text" are provided below the item of "text"; and "detailed function setting items" of "printed photograph", "photography paper photograph", and "copied document" are provided below the item of "photograph".

For these function items, corresponding explanation items are prepared in the help data 66. That is, an explanation item "Ha" is prepared for "quality of document" which is the "function selection item"; and explanation items of "Hb", "Hc", "Hd", "He", and "Hf" are prepared for items of "automatic", "text/photograph", "text", "photograph", and "map," which are the "function setting items". In addition, "Hg", "Hh", "Hi", "Hj", "Hk", "Hl", "Hm", and "Hn" are prepared for the items of "printed photograph", "photography paper photograph", "copied document", "printed text", "pencil text", "printed photograph", "photography paper photograph", and "copied document", which are "detailed function setting items".

The user executes an operation through the touch panel 18 to sequentially call items of lower levels according to the hierarchy, and sets the functions. In addition, the user may complete the setting or call another item without setting the called item. In other words, it is possible to employ a configuration in which the user can freely select a selection item provided in a hierarchical order regardless of whether or not the user actually sets the functions. This action can be considered to be the user "provisionally selecting" each selection item. When the user executes an operation to realize a provisionally selected result to actually set the functions, this action can be considered "definitive selection". For example, an action to decide the provisional selection result for an item by provisionally selecting the item and pressing a "close" button or "decision" button can be considered a "definitive selection." In addition, for example, an action to provisionally select an item, and to press a "start" button or an "execute" button before the provisional selection is invalidated, to thereby execute the process while the provisional selection for the item is valid, may be considered a "definitive selection".

In a case where a "close" button and a "decision" button are provided, but the "start" button is pressed while the "close" button and the "decision" button are not pressed (that is, the provisionally selected function is executed), the action to press the "start" button is the definitive selection.

Figure 5:
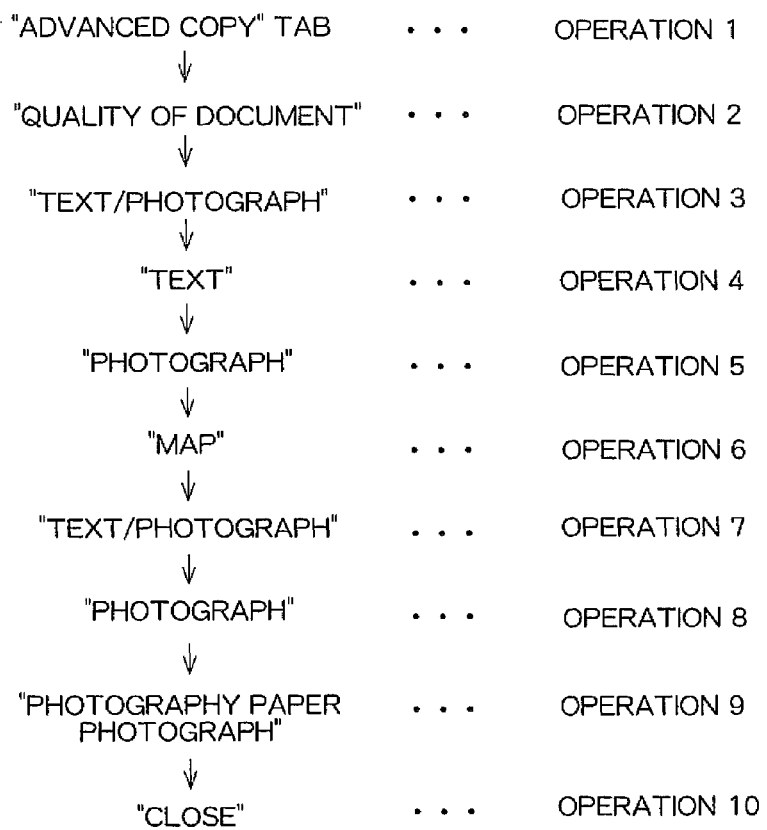
FIG. 5 is a diagram showing an example selection process of a selection item.

FIG. 5 is a diagram showing an example in which the user sequentially selects selection items through operations on the touch panel 18. The corresponding operation order is described also in FIG. 4 as operations 1-9. In the illustrated example configuration, after the user selects "advanced copy" (operation 1) in the display screen of FIG. 3, the user sequentially provisionally selects items of "quality of document" (operation 2), "text/photograph" (operation 3), "text" (operation 4), "photograph" (operation 5), "map" (operation 6), "text/photograph" (operation 7), "photograph" (operation 8), and "photography paper photograph" (operation 9), and then selects "close" (operation 10) to definitively select the item of "photography paper photograph".

Next, a process executed by the function processors shown in FIG. 2 when such operations are executed is described with reference to FIG. 6. When the user operation is executed, the panel controller 46 executes a panel event process. In other words, a display process of the selection item by the display processor 48 and the acquisition of the user operation signal by the operation event acquisition unit 50 are executed. The acquired operation event is transmitted to the operation history recording unit 44, which in turn records the operation event as the operation history data 60. Upon execution of an event to decide a selection; that is, the definitive selection by pressing the "close" button, the panel controller 46 transmits to the action determination unit 52 information that the event has occurred. In this case, the action determination unit 52 acquires information of a number of steps which are required until the definitive selection (the number of required steps is 9 in the illustrated example of FIG. 5) from the operation history recording unit 44 (or operation history data 60), and acquires information of a standard number of steps in this setting from the standard operation number data 62. In the illustrated example, information of "standard number of steps=5" corresponding to the "quality of document" is acquired. Alternatively, in place of the item of the upper level ("quality of document"), the standard number of steps for the item of a lower level ("photography paper photograph") may be acquired.

Next, the action determination unit 52 determines whether or not help is to be displayed, on the basis of a comparison between the required number of steps and the standard number of steps. More specifically, the action determination unit 52 determines that the help is to be displayed when the required number of steps is greater than the standard number of steps, and requests execution of the help display to the help generation processor 56. The help generation processor 56 acquires a necessary explanation item from the help data 66, and generates a help display image. The display processor 48 then displays the help display image. In place of immediately displaying the help display image, the help generation processor 56 may display that display of the help display image is prepared, and display the help display image upon receipt of a display instruction from the user.

FIGS. 7A to 7D are diagrams showing display of help on the touch panel 18. FIG. 7A shows an example of a display in the setting of the "quality of document", and, similar to FIG. 3, a text indicating the state of the image processor 10 of "copy possible" shown by reference numeral 80 is displayed at an upper part of the screen. Below this display, a text of "quality setting of document" denoted by reference numeral 100 is displayed, indicating that a function item of the "quality of document" or a function item of a lower level is being selected. In addition, to the right of this column, a cancel button 102 and a close button 104 are displayed, which accept a selection to cancel setting of the "quality of document" and a selection to decide the setting for "quality of document", respectively. In a region 106 provided at a lower part of the screen, for example, there may be displayed various function item buttons related to the "quality of document" or a start button for immediately starting the copy with the current setting decided.

In the illustrated configuration of FIG. 7A, a user 108 presses the close button 104. In this case, when it is determined that help is to be displayed according to the process of FIG. 6, a display of FIG. 7B is displayed.

In FIG. 7B, a help display 110 is displayed below the display of "copy possible" shown by reference numeral 80, and a close button 112 is also displayed in the help display 110. In this screen, when the user 114 presses the close button 112, display of FIG. 7D; that is, the display similar to FIG. 3, is displayed on the touch panel 18.

FIG. 7C is a diagram showing another example display when the close button 104 is pressed in FIG. 7A. FIG. 7C is basically similar to FIG. 7D, except that, at the uppermost section, a display of "copy possible (help available)" as shown by reference numeral 120 is displayed, and a "?" button 122 is displayed. When the user presses the "?" button 122, the display of FIG. 7B is displayed. When, on the other hand, the "?" button 122 is not pressed for a predetermined time period, the display is switched to the display of FIG. 7D.

In the help display, various settings can be employed as to which selection item is to be explained. FIG. 8 exemplifies a standard for selecting the selection item for which the help is to be displayed.

In a first example configuration in FIG. 8, "provisionally selected function setting item and detailed function setting item" are explained. When a selection as shown in FIG. 5 is selected under the hierarchical structure of FIG. 4, the items of "text/photograph", "text", "photograph", "map", and "photography paper photograph" satisfy this condition, and explanation is given on the basis of the explanation items Hc, Hd, He, Hf, and Hm.

In a second example configuration, "function item which is provisionally selected multiple times" are explained. In the illustrated example of FIGS. 4 and 5, the items satisfying this condition are "text/photograph" and "photograph", and explanation is given by reference to two explanation items of Hc and He.

In a third example configuration, "provisionally selected function setting item and detailed function setting item" and "function setting item and detailed function setting item at the same hierarchical level" are explained. In this case, the function setting items of "automatic", "text/photograph", "text", "photograph", and "map" and the detailed function setting items of "printed photograph", "photography paper photograph", and "copied document" satisfy the condition, and explanation is given by reference to the explanation items Hb, Hc, Hd, He, Hf, Hl, Hm, and Hn.

In a fourth example configuration, "selection items provisionally selected in a hierarchical level in which a predetermined ratio or more is provisionally selected" are explained. For example, when the predetermined ratio is set at 50%, of the "function setting items", four out of five items are provisionally selected and satisfy the condition. Thus, explanation items Hc, Hd, He, and Hf related to "text/photograph", "text", "photograph", and "map" are selected. On the other hand, in the "detailed function setting items" including the "photography paper print", only one out of three items is provisionally selected and the ratio is less than 50%, and, thus, these items are not explained.

In a fifth example configuration, "function items in the same hierarchical level as function items provisionally selected for multiple number of times" and "selection items of upper levels of these items" are explained. The function setting items of "automatic", "text/photograph", "text", "photograph", and "map", and "quality of document", which is the upper level of these items, satisfy this condition. Therefore, explanation is given by reference to the explanation items Ha, Hb, Hc, Hd, He, and Hf.

In a sixth example configuration, "a provisionally selected function item" and "function items in a lower level than this function item" are explained. The function setting items of "text/photograph", "text", "photograph", and "map" and the detailed function setting items below these function items including "printed photograph", "photography paper photograph", "copied document", "printed text", "pencil text", "printed photograph", "photography paper photograph", and "copied document" satisfy this condition. Therefore, explanation is given by reference to the explanation items Hc, Hd, He, Hf, Hg, Hh, Hi, Hj, Hk, Hl, Hm, and Hn.

When there are multiple explanation items to be explained, a priority order of explanation may be assigned by reference to a condition. In addition, when the number of the explanation items to be explained is a predetermined number or greater, the explanation items may be narrowed by reference to a condition.

In the above-described example, there is shown a configuration in which the user provisionally selects under one function selection item ("quality of document"), but the user may provisionally select while moving over multiple function selection items. In this case, the explanation items can be narrowed by only setting the function selection item which is definitively selected as the explanation target.

[Second Exemplary Embodiment]

A second exemplary embodiment will now be described.

Similar to the first exemplary embodiment, the second exemplary embodiment is implemented using hardware and processing functions shown in FIGS. 1 and 2. The second exemplary embodiment differs from the first exemplary embodiment in that the determination of whether or not help is to be displayed is made while the user is setting the process.

Figure 9:
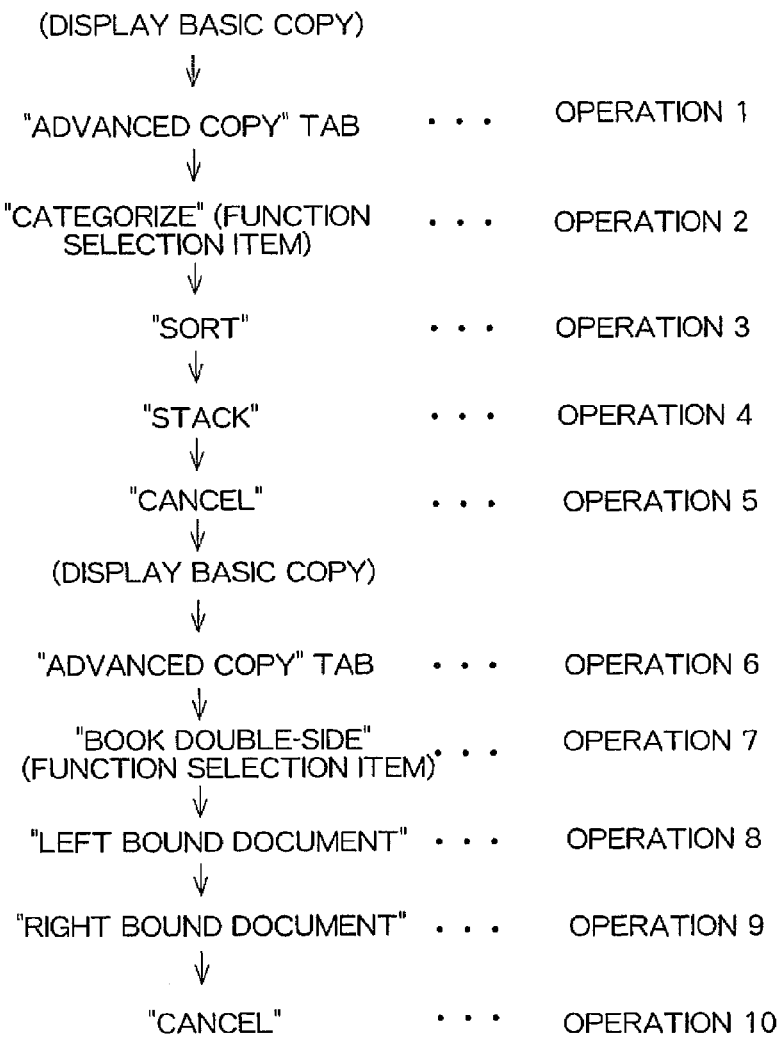
FIG. 9 is a diagram showing an example selection process of a selection item.

FIG. 9 is a diagram similar to FIG. 5 and shows user operations related to the second exemplary embodiment. Here, there is considered a case in which the user selects various selection items starting from a screen display of a basic copy shown in FIG. 3.

The user first selects the "advanced copy" tab (operation 1), and then selects "categorize" as a function selection item (operation 2). Next, the user selects "sort" and "stack" in this order from among the function setting items located at a lower level of the "categorize" (operations 3 and 4), but cancels these selections by pressing the "cancel" button (operation 5). As a result of this cancellation, the screen display returns to the initial state, and the basic copy is displayed. The user again selects, in this screen, the "advanced copy" tab (operation 6), and selects a "book double-side" as the function selection item (operation 7). Then, the user selects "left bound document" and "right bound document" in this order from among the function setting items located at a lower hierarchical level of the "book double-side" (operations 8 and 9). However, the user cancels these selections by pressing the "cancel" button (operation 10).

Figure 6:
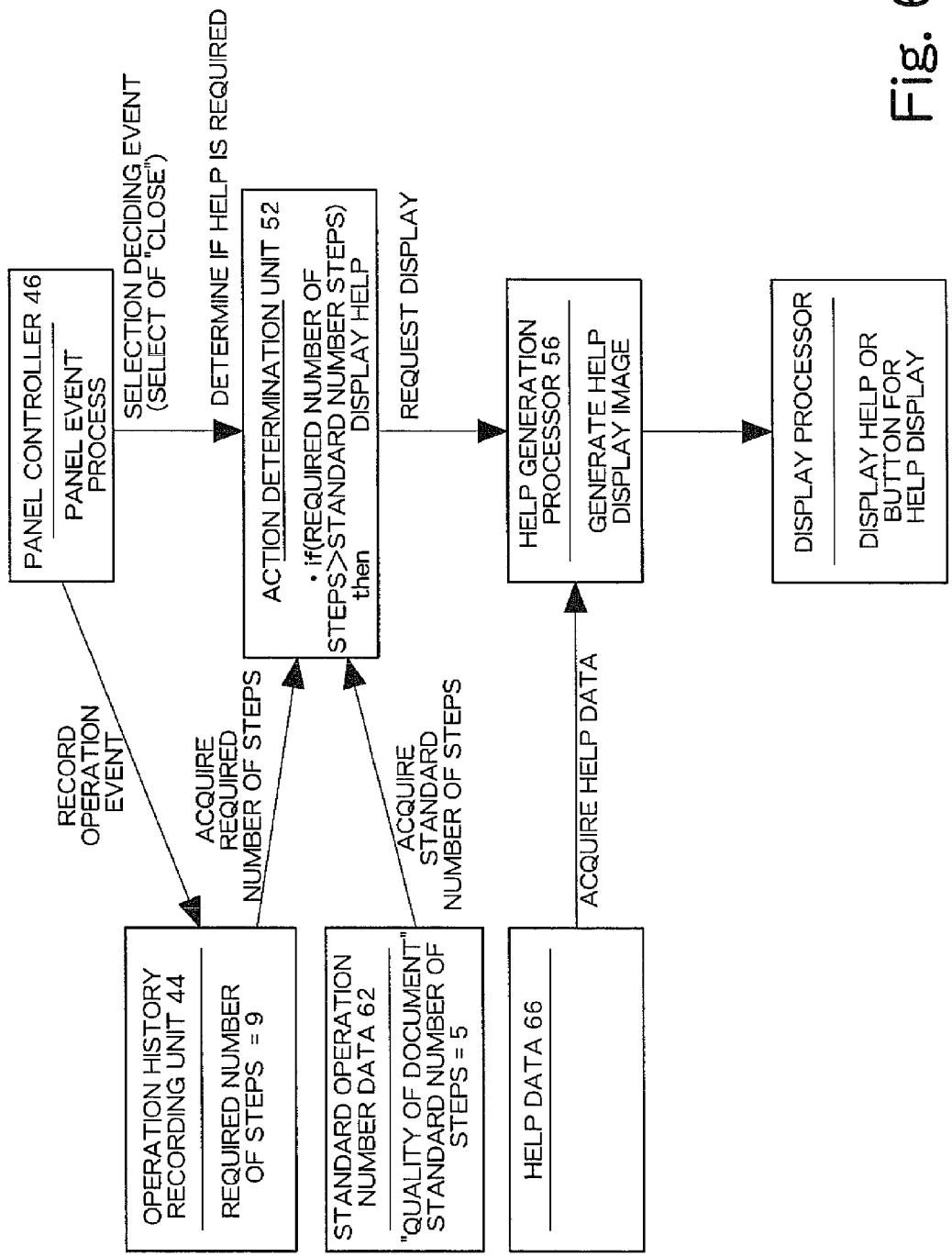
FIG. 6 is a diagram for explaining a process performed in each functional processor.
Figure 10:
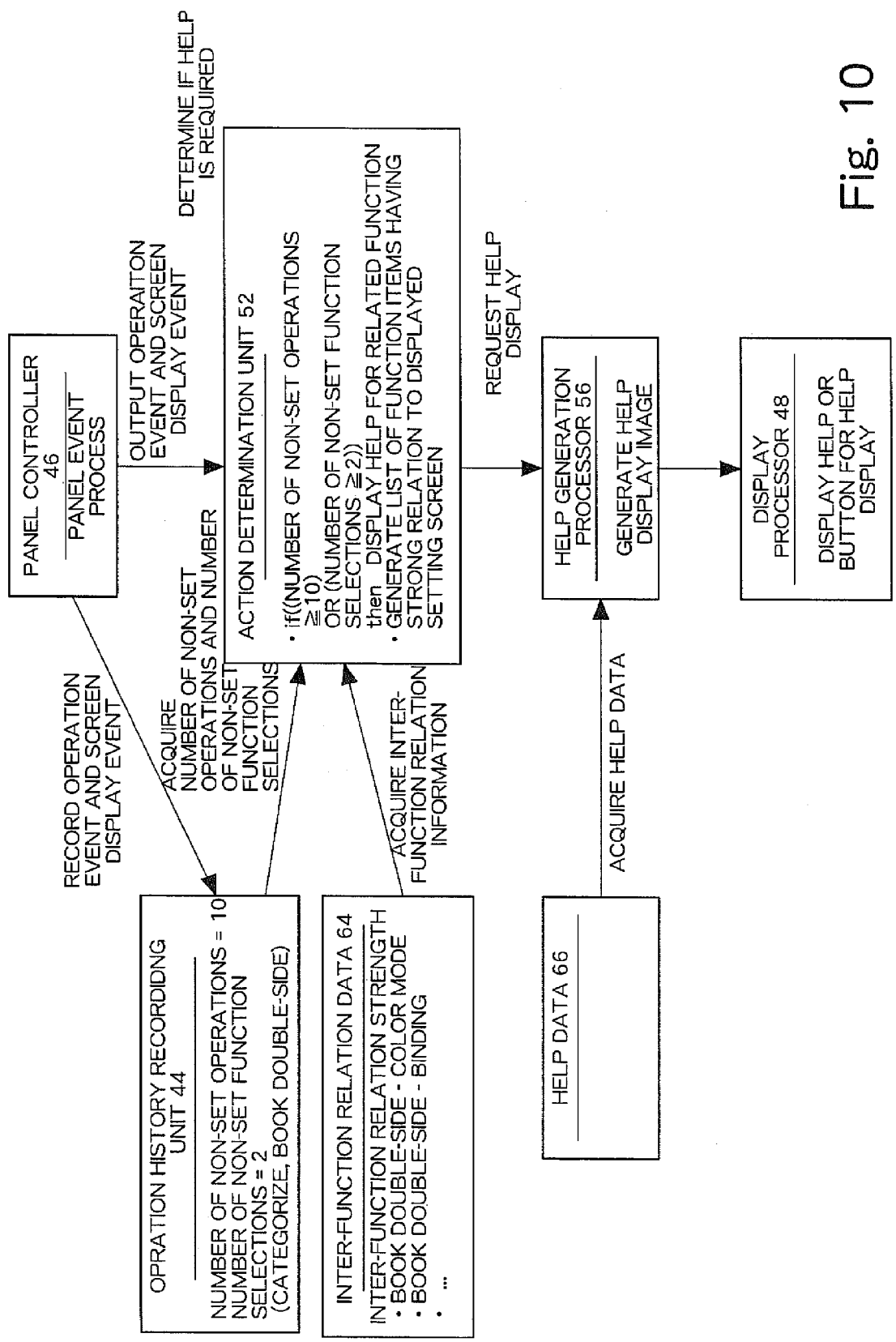
FIG. 10 is a diagram for explaining a process performed in each functional processor.

FIG. 10 is a diagram corresponding to FIG. 6, and shows a process of executing the help display process under the user operations shown in FIG. 9. In this example, the operation history recording unit 44 acquires records of the operation event and the screen display event from the panel controller 46, and records the same as the operation history data 60. For the user operations shown in FIG. 9, there is made a record that the number of non-set operations (number of operations provisionally selected but not definitively selected) is 10 and a number of non-set function selections (number of function selection items provisionally selected but not definitively selected) is 2 ("categorize" and "book double-side").

The action determination unit 52 acquires the record of the operation event and the screen display event from the panel controller 46 and acquires information of the number of non-set operations and the number of non-set function selections from the operation history recording unit 44 (or operation history data 60). Based on the number of non-set operations and the number of non-set function selections, the action determination unit 52 determines whether or not help is to be displayed for a related function. More specifically, in this example configuration, the action determination unit 52 determines that the help is to be displayed when the number of non-set operations is greater than or equal to a predetermined threshold value (here, 10) or when the number of non-set function selections is greater than or equal to a predetermined threshold value (here, 2). The operations shown in FIG. 9 satisfy this condition. Therefore, a list of function items having a strong relation to the provisionally selected function item is generated and output to the help generation processor 56. The process for the help generation processor 56 to acquire necessary explanation items from the help data 66 and generate the help display image and the process for the display processor 4B to display a button for help display or button showing that a help display is available are similar to those in the example configuration of FIG. 6.

Figure 11:
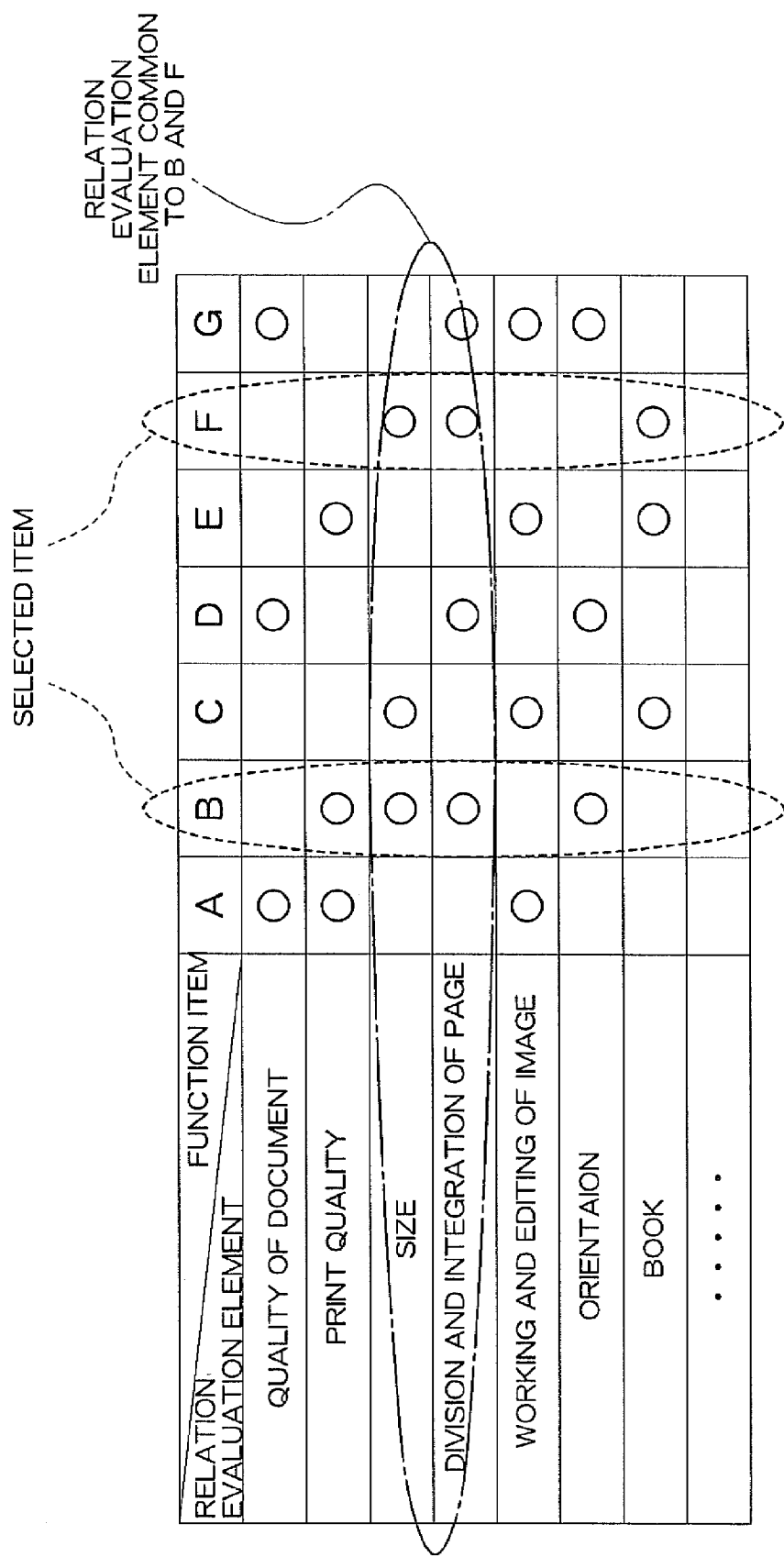
FIG. 11 is a diagram showing an example of inter-function relation data.

A process for the action determination unit 52 to select a function item for which the help is to be displayed will now be described with reference to FIG. 11. FIG. 11 shows the inter-function relation data 64 in a table form. In this table, elements for evaluating the relation (relation evaluation elements) such as "document quality", "print quality", "size", "division and integration of page", "working/editing of image", "orientation", "book", etc., are correlated to function items A-G (more specifically, the "quality of document", "categorize", "sort", etc. shown in FIGS. 4 and 9). In other words, the relation between the function items A-G and the relation evaluation element is evaluated, and, items determined as having a deep relation is indicated by a circle mark.

The relation can be evaluated in various manners. As an example, there may be considered a configuration in which the relation is evaluated by the similarity in the function. For example, with regard to the relation evaluation element of "orientation", function items related to, for example, paper selection, orientation of the document, rotation of the image, etc. may be considered to have a strong relation. With regard to the relation evaluation element of "division and integration of page", function items related to, for example, Nup (method of printing N pages on one piece of paper), page consecutive shooting (method in which halves of a page are printed on separate pieces of paper), poster (method in which a page is enlarged and printed on N pieces), etc. may be considered to have a strong relation. Alternatively, the relation may be evaluated on the basis of similarity of names. For example, "single side/double-side (printing)" and "book double-side (printing)" may be evaluated as being similar, or "book double-side", "binding", and "cover attachment" may be evaluated as similar names. In addition, a "build job" and a "job memory" may be evaluated as having similar names.

In the example configuration of FIG. 11, there is considered a case in which function items B and F are selected by the user operation. Here, the function B has relation to "print quality", "size", "division and integration of page", and "orientation" among the relation evaluation elements, and the function item F has a relation to "size", "division and integration of page", and "book" among the relation evaluation elements. Therefore, in this example, the action determination unit 52 first extracts the relation evaluation items of "size" and "division and integration of page" which are common to the function items B and F. The action determination unit 52 determines a function item having a relation to any of the extracted relation evaluation items as a function item for which the help is to be displayed. Specifically, the function items C, D, and G are selected as targets of help display in addition to the function items B and F.

The action determination unit 52 sets a priority order (which is used, for example, as a display order) for the items for which the help is to be displayed, selected in this manner. The priority order may be determined by reference to, for example, the number of relation evaluation elements determined as having a relation. In other words, the item having relation to a larger number of relation evaluation elements may be assigned a higher priority order. Alternatively, the priority order may be determined by reference to a distance between display positions of the function items. The display positions may be evaluated as being close to each other when the items are displayed on the same screen and as being distant from each other when the items are displayed on different screens. For example, in view of assigning a higher priority order to items with higher unpredictability, the priority order may be set such that a higher priority order is assigned to a distant item. Similarly, from the viewpoint of assigning a higher priority order for items with higher unpredictability, for example, it is possible to assign a lower priority order for the provisionally selected function item and a higher priority order for the function item which is not provisionally selected.

Figure 12:
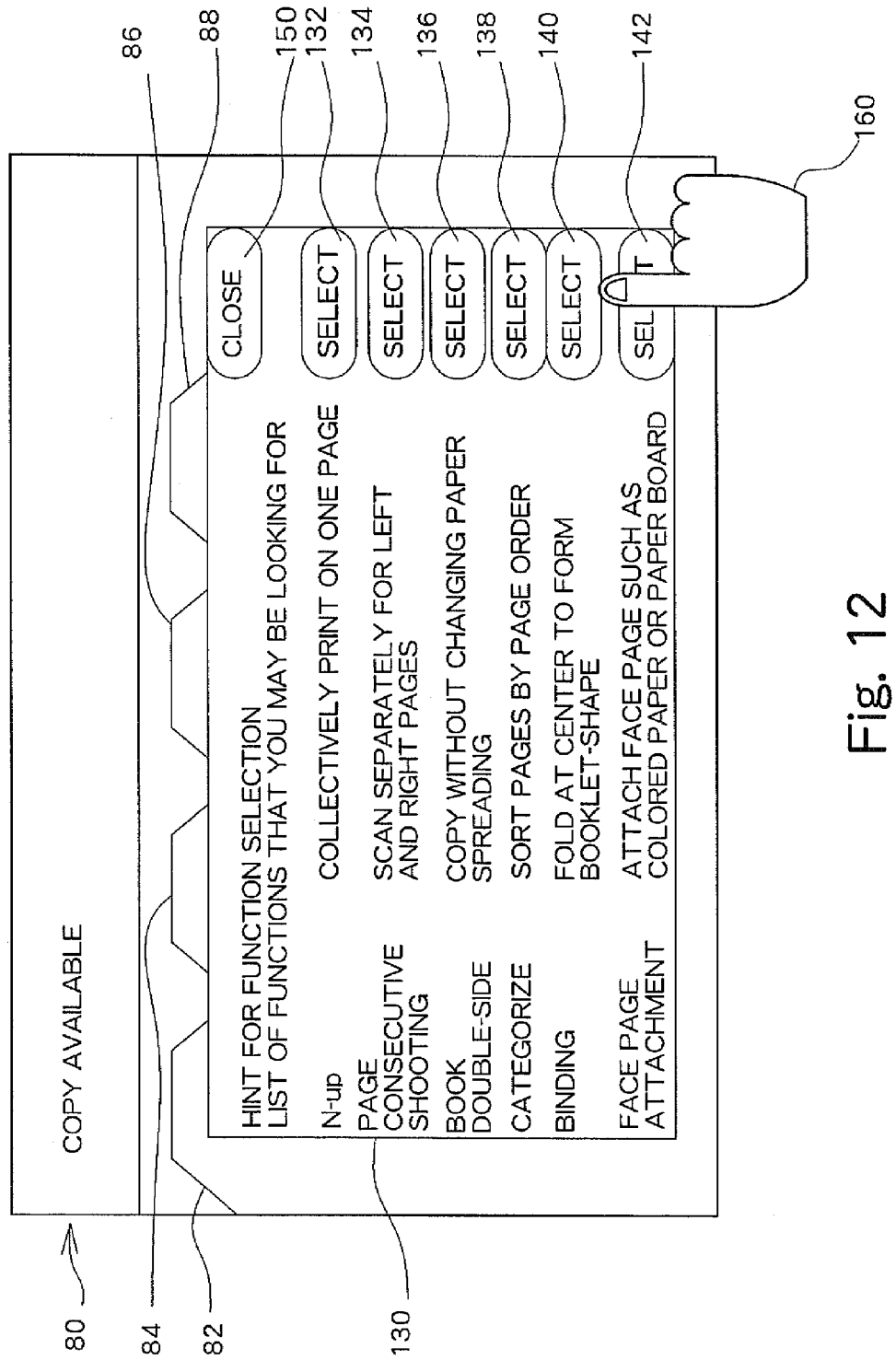
FIG. 12 is a diagram showing an example of a help display.

FIG. 12 is a diagram showing an example of the help display for an explanation item thus selected. In the illustrated example, a help display 130 entitled "hint of function selection: list of functions that you may be looking for" is displayed above the display of basic copy shown in FIG. 3. More specifically, there is displayed help indicating that the function item "N-up" indicates a function to "collectively printing on one page"; the function item "page consecutive shooting" indicates a function to "scan separately for left and right pages"; the function item "book double-side" indicates a function to "copying without changing page spreading"; the function item "categorize" indicates a function to "sort pages by page order"; the function item "binding" indicates a function to "fold at the center to form a booklet-shape"; and the function item "face page attachment" indicates a function to "attach a face page such as colored paper or paperboard". For the explanations of the function items, selection buttons 132-142 are provided for setting the respective functions. In the illustrated example, a user 160 selects the selection button 140 for "binding". In the help display 130, a close button 150 is provided so that the user can stop the help display 130 by pressing the close button.

[Third Exemplary Embodiment]

A third exemplary embodiment will next be described.

The third exemplary embodiment relates to a change of format of the help display. This exemplary embodiment may be implemented independently from the first exemplary embodiment and the second exemplary embodiment, or implemented in combination with the first exemplary embodiment and the second exemplary embodiment.

FIG. 13 is a diagram for explaining a format of the help display. FIG. 13 shows four forms of "does not know how to use function", "does not know meaning of choice", "cannot find desired function", and "different from familiar machines" as types of unclear points. For each form, a description format, a selection format, and a display format are shown.

The type of unclear points is a classification of types of unclear points for the user. In particular, the type is described in simple expression in consideration of the process to inquire the user of the type of the unclear points. Alternatively, a different classification may be employed.

The description format classifies the description of the help display. As the description format, a "function description format" and a "function item detail explanation format" are provided. The former format, "function description format", explains the function in a simple manner in a form of "function X is . . . ". The latter format, "function item detail explanation format", explains the function in a relatively detailed manner.

The selection format defines which data is to be selected from the help data for explaining the explanation item. For the selection format, a "manual structure format", an "inter-function relation format", an "inter-function relation term similarity format", and "inter-machine correspondence relationship format" are prepared. In the "manual structure format", data necessary for explaining an operation method according to a procedure is selected. In the "inter-function relation format", an explanation item for a related function is also selected, and a comparative explanation with the related function is given. In the "inter-function relation term similarity format", an explanation item of a related function having a similar term is selected, and a comparative explanation with the related function is given. In the "inter-machine correspondence relationship format", explanation data for another machine model of the company or explanation data for products of other companies are selected, and a comparative explanation with the other products is given.

The display format defines a display form with respect to the screen. The display format includes a "wizard format", a "text format", and a "menu format". The "wizard format" is a format in which the item is explained while the screen is switched following stages; the "text format" is a format in which the item is explained by displaying a text; and the "menu format" is a format in which the user is provided with choices and the selected item is explained.

Figure 14:
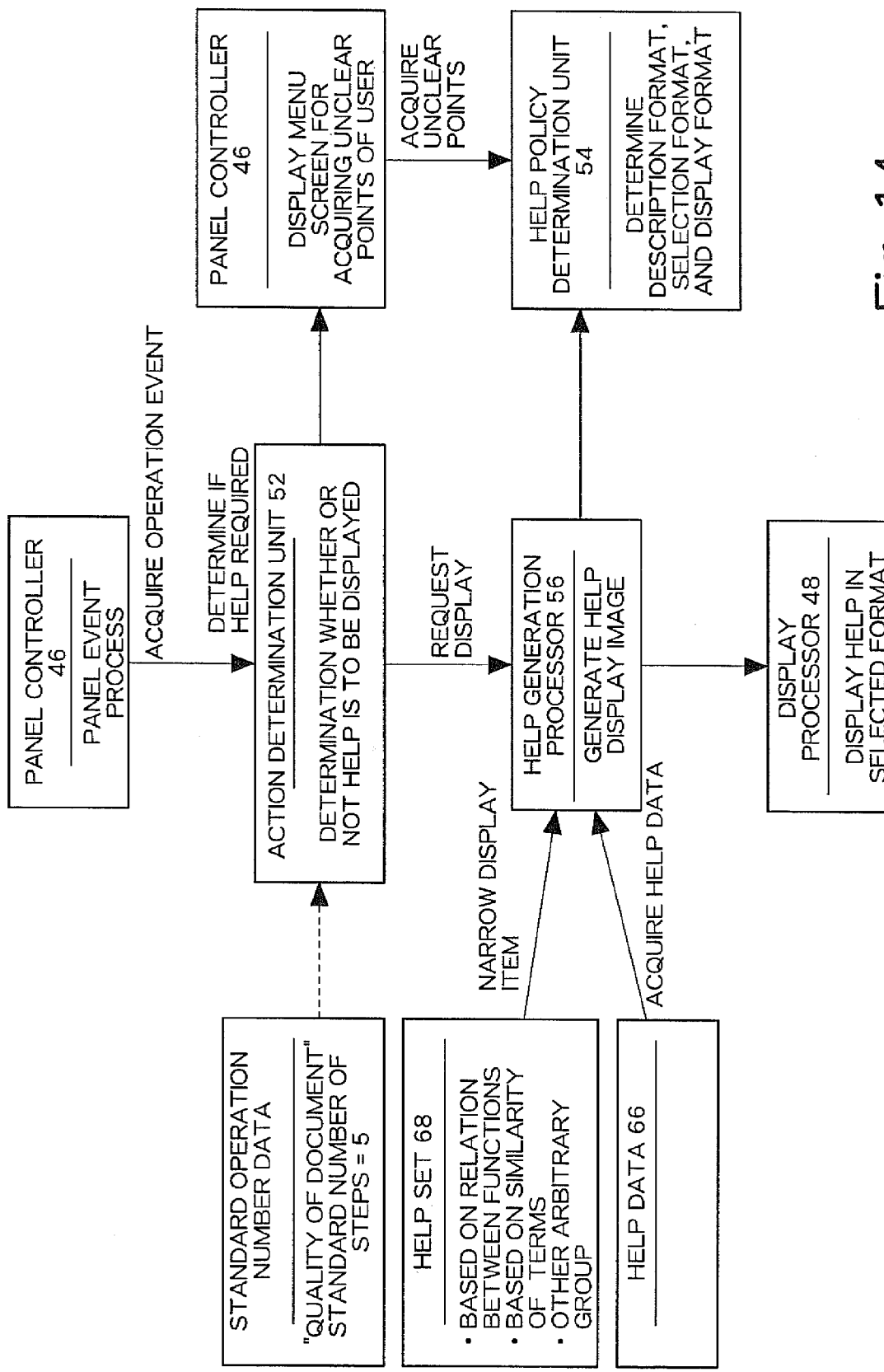
FIG. 14 is a diagram for explaining a process performed when a display format is changed.

Next, a process for realizing the display based on these formats will be described with reference to FIG. 14. FIG. 14 is a diagram corresponding to FIG. 6, and shows operations of the function processors of FIG. 2.

In the illustrated example, similar to the first and second exemplary embodiments, the action determination unit 52 determines whether or not the help is to be displayed, by reference to the operation event and standard operation number data 62 acquired from the panel controller 46, and, when the help is to be displayed, the action determination unit 52 determines for which item the help is to be displayed. However, in this exemplary embodiment, it is also possible to explicitly inquire the user for the help display in place of the determination by the action determination unit 52.

When the help is to be displayed, the panel controller 46 displays a menu (items) for inquiring the user of the type of the unclear point, and acquires the unclear point by reference to a selection result by the user. The help policy determination unit 54 maintains the information shown in FIG. 13 as a table, determines the description format, selection format, and display format corresponding to the unclear point, and outputs the determined formats to the help generation processor 56.

The help generation processor 56 generates the help display image by reference to the help display request which is input from the action determination unit 52 and the format information which is input from the help policy determination unit 54. In this generation, the help generation processor 56 refers to the help set 68 to narrow the items to be acquired from the help data 66. The display image generated in this manner is displayed by the display processor 48.

Figures 15A, 15B:
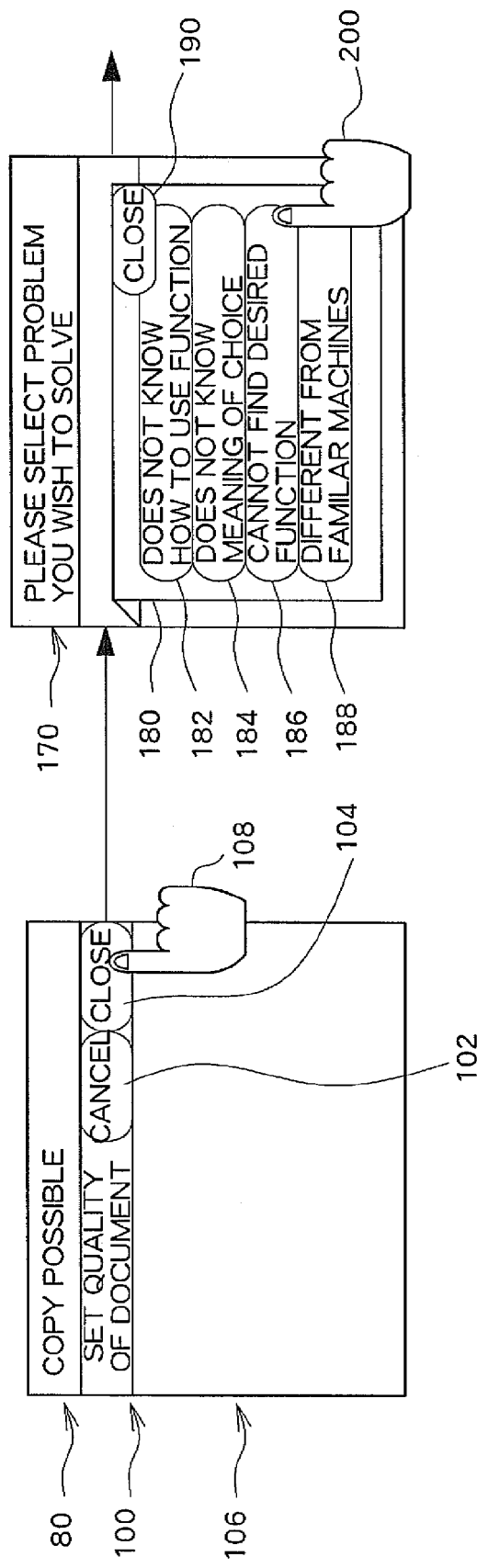

FIGS. 15A to 15E are diagrams for explaining an example of a display according to a third exemplary embodiment. FIG. 15A is a diagram similar to FIG. 7A, and shows completion of the screen display related to "setting of quality of document" by the user 108 pressing the close button 104. In this example configuration, the condition for displaying help is satisfied as a result of this completion process.

FIG. 15B shows a screen which is displayed after the display of FIG. 15A. A display of "please select your problem" shown by reference numeral 170 is displayed at an uppermost portion of the screen, and there is displayed a display 180 including the selection candidate items. More specifically, item 182 for "does not know how to use function", item 184 for "does not know meaning of choice", item 186 for "cannot find desired function", and item 188 for "different from familiar machines" are displayed. In addition, a close button 190 is also displayed. The items 182-188 are identical to the "type of unclear points" shown in FIG. 13.

The user 200 selects a desired item in this screen. As a result, the help is displayed in the description format, selection format, and display format corresponding to the selected item. FIGS. 15C, 15D, and 15E are diagrams for explaining example displays displayed in this manner.

FIG. 15C is a diagram similar to FIG. 7B. The illustrated display is displayed, for example, for the case of "does not know meaning of choice", and a detailed explanation of the function item for "setting quality of document" is displayed in a text format while being compared to a related function item.

FIG. 15D is a diagram similar to FIG. 12, and the illustrated display is displayed, for example, for the case of "cannot find desired function", and explanation of the function item is displayed in a menu format centered at similar terms as a "hint for function selection".

FIG. 15E is a display which is displayed, for example, for the case of "does not know how to use function". In this display, display of "copy possible" shown by reference numeral 210 is displayed at the uppermost portion, and a display 212 of a wizard format entitled "screen parameter setting wizard" is displayed below the display 210. Here, there are displayed displays indicating that the function item of "automatic" indicates "automatic determination" (reference numeral 216), that the function item of "text" indicates a "document mainly of texts" (reference numeral 218), that the function item of "photograph" indicates "document mainly of photograph" (reference numeral 220), that the function item of "text/photograph" indicates a "document in which text and photograph are mixed" (reference numeral 222), and that the function item of "map" indicates a "map-like document" (reference numeral 224), and, in addition, a close button 226 and a "next page" button 228 for designating transition to the next page are displayed. This display is displayed, for example, for the case of "does not know how to use function", and the explanation of the function items is displayed in the wizard format according to a structure of the manual.

In the above-described exemplary embodiments, there is described a configuration in which a help item necessary for the user is found by reference to the operation of the user and is displayed in real time. Alternatively, it is also possible to determine and display the necessary help item at separate timings. For example, there may be employed a configuration in which the past operation history data 60 is analyzed to find an item that the user has difficulty operating, and a help display related to the item is displayed at the time when the user actually selects the item (or opens a screen in which the item can be selected).

It is also possible to consider the past operation history data 60 in determination of whether or not the help is to be displayed or which help is to be displayed. Specifically, settings of the standard operation number data 62 and the inter-function relation data 64 may be set by reference to the past operation history data 60. The past operation history data 60 may be used distinguishingly for each user (that is, the operation history data 60 of a certain user is only used for change of setting of the standard operation number data 62 and the inter-function relation data 64 of that user), used for each user group, or used regardless of the user. It is also possible to employ a configuration in which operation history data 60 of multiple devices belonging to an organization such as a customer organization is acquired through the network 30 and the result is reflected in the standard operation number data 62 and the inter-function relation data 64 of these devices.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An information processor comprising:
an information processing unit that executes an information process by reference to a setting;
a setting unit that executes a provisional selection to select one or more selection items among a plurality of selection items and a definitive selection for deciding the provisional selection by reference to an operation by a user and determines a setting of the information process based on a result of the definitive selection;
a determination unit that determines, as a selection item to be explained, a selection item having a strong relation with the selection item provisionally selected by the setting unit when the number of operations provisionally selected but not definitively selected or the number of function selection items provisionally selected but not definitively selected exceeds a predetermined threshold value, the function selection items being items for selecting a summary of a function to; and
an explanation outputting unit that outputs an explanation for the user for the selection item to be explained determined by the determination unit;
said determination unit assigning, among the selection items to be explained, a higher priority order of explanation to selection items that have not been provisionally selected.

2. The information processor according to claim 1, wherein the determination unit determines the selection item to be explained for the user by reference to a relationship between a definitively selected selection item and a provisionally selected selection item when the setting unit definitively selects the selection item.

3. The information processor according to claim 1, wherein the provisional selection of the selection item by the setting unit is executed by provisionally selecting a selection item in a plurality of stages from among a plurality of selection items having a hierarchical structure; and
the determination unit determines the selection item to be explained for the user by reference to a relation, in the hierarchical structure, between the selection items provisionally selected by the setting unit.

4. The information processor according to claim 1, wherein the explanation outputting unit can output in a plurality of formats for the same selection item.

5. The information processor according to claim 1, wherein the selection items used in said setting unit have a hierarchical structure, a function selection item at an upper level being an item for selecting a summary of a function to be set, a function selection item at a lower level being an item for designating a setting value for the function selection item at the upper level;
said determination unit determining a function selection item and a detailed selection item in the same hierarchy as an item to be explained to the user.

6. The information processor according to claim 1, wherein the determination unit evaluates at least the similarity of functions or the similarity of names as the relation between the selected items.

7. The information processor according to claim 1, wherein the explanation outputting unit outputs an explanation of a type of product which is not available from the information processor.

8. The information processor according to claim 1, wherein the determination unit uses a history of the provisional selections for each user or each user group.

9. The information processor according to claim 1 further comprising a memory which stores a table associating an unclear point for the user with representation formats explaining the unclear point, including a description format, a selection format, and a display format, wherein the explanation outputting unit outputs to the user an explanation of the selection item to be explained which has been determined by the determination unit according to the representation formats associated with the unclear point selected by the user based on the table.

10. The information processor according to claim 1, wherein at least one of elements for evaluating a relation is one of document quality, print quality, size, division and integration of page, working/editing of image, orientation, and book.

11. A non-transitory computer-readable recording medium storing a program causing a computer to execute an information process, the information process comprising:
executing an information process by reference to a setting;
executing a provisional selection to select one or more selections among a plurality of selection items and a definitive selection for deciding the provisional selection by reference to an operation by a user and setting the information process by reference to a result of the definitive selection;
determining, as a selection item to be explained, a selection item having a strong relation with the selection item provisionally selected by the setting unit when the number of operations provisionally selected but not definitively selected or the number of function selection items provisionally selected but not definitively selected exceeds a predetermined threshold value, the function selection items being items for selecting a summary of a function to be set;

outputting an explanation for the user for the determined selection item to be explained; and assigning, among the selection items to be explained, a higher priority order of explanation to selection items that have not been provisionally selected.

12. The non-transitory computer-readable recording medium according to claim 11, wherein in the determining, the selection item to be explained for the user is determined by reference to a relationship between a definitively selected selection item and a provisionally selected selection item when the selection item is selected in the setting.

13. The non-transitory computer-readable recording medium according to claim 11, wherein the provisional selection of the selection item in the setting is executed by provisionally selecting a selection item in a plurality of stages from among a plurality of selection items having a hierarchical structure; and in the determining, the selection item to be explained for the user is determined by reference to a relation, in the hierarchical structure, between the selection items provisionally selected in the setting.

14. The non-transitory computer-readable recording medium according to claim 11, wherein in the executing the provisional selection, the selection items used have a hierarchical structure, a function selection item at an upper level being an item for selecting a summary of a function to be set, a function selection item at a lower level being an item for designating a setting value for the function selection item at the upper level;

in the determining, determining a function selection item and a detailed selection item in the same hierarchy as an item to be explained to the user.

15. An information processing method comprising:

executing an information process by reference to a setting;

executing a provisional selection to select one or more selections among a plurality of selection items and a definitive selection for deciding the provisional selection by reference to an operation by a user and setting the information process by reference to a result of the definitive selection;

determining, as a selection item to be explained, a selection item having a strong relation with the selection item provisionally selected by the setting unit when the number of operations provisionally selected but not definitively selected or the number of function selection items provisionally selected but not definitively selected exceeds a predetermined threshold value, the function selection items being items for selecting a summary of a function to be set;

outputting an explanation for the user for the determined selection item to be explained; and assigning, among the selection items to be explained, a higher priority order of explanation to selection items that have not been provisionally selected.

16. The information processing method according to claim 15, wherein in the determining, among selection items provisionally selected by said setting unit, an item is determined that has been selected a plurality of times as an item to be explained to the user.

17. The information processing method according to claim 15, wherein in the executing the provisional selection, the selection items used have a hierarchical structure, a function selection item at an upper level being an item for selecting a summary of a function to be set, a function selection item at a lower level being an item for designating a setting value for the function selection item at the upper level;

in the determining, determining a function selection item and a detailed selection item in the same hierarchy as an item to be explained to the user.

* * * * *